United States Patent
Muth

(10) Patent No.: US 10,605,407 B2
(45) Date of Patent: Mar. 31, 2020

(54) PROTECTIVE HOUSING FOR A TESTING, MEASURING OR PRODUCTION DEVICE

(71) Applicant: Schenck RoTec GmbH, Darmstadt (DE)

(72) Inventor: Christian Muth, Fischbachtal (DE)

(73) Assignee: Schenck RoTec GmbH, Darmstadt (DE)

(*) Notice: Subject to any disclaimer, the term of this patent is extended or adjusted under 35 U.S.C. 154(b) by 215 days.

(21) Appl. No.: 15/572,006

(22) PCT Filed: May 12, 2016

(86) PCT No.: PCT/EP2016/060623
§ 371 (c)(1),
(2) Date: Nov. 6, 2017

(87) PCT Pub. No.: WO2016/180909
PCT Pub. Date: Nov. 17, 2016

(65) Prior Publication Data
US 2018/0128423 A1   May 10, 2018

(30) Foreign Application Priority Data
May 13, 2015   (DE) .......................... 10 2015 107 612

(51) Int. Cl.
*F16P 3/08* (2006.01)
*E06B 3/48* (2006.01)
(Continued)

(52) U.S. Cl.
CPC ..................................... *F16P 3/02* (2013.01);
*E06B 3/48* (2013.01); *E06B 9/0638* (2013.01);
*F16P 3/08* (2013.01); *E06B 2009/002* (2013.01)

(58) Field of Classification Search
CPC .... F16P 3/08; E06B 2009/002; E06B 9/0638; E06B 3/48
(Continued)

(56) References Cited

U.S. PATENT DOCUMENTS 2,252,139 A * 8/1941 Schlacter ............... F24C 15/026
160/201
2,739,730 A * 3/1956 Irving .................... B65F 1/1484
160/201
(Continued)

FOREIGN PATENT DOCUMENTS

DE   34 11 394 A1   10/1985
DE   37 09 884 A1   10/1988
(Continued)

OTHER PUBLICATIONS

International Search Report of PCT/EP2016/060623, dated Aug. 9, 2016.

*Primary Examiner* — Kyle R Grabowski
(74) *Attorney, Agent, or Firm* — Collard & Roe, P.C.

(57) ABSTRACT

A protective housing for a testing, measuring or production device has a protective element, which seals a housing opening and is held and guided by guide devices and can be moved into an open position by a drive device. The guide devices have arched sections which are outwardly curved forward and extend backwards in a straight line on an upper side of the protective housing. The protective element includes two flexurally stiff rectangular plates, which have straight longitudinal sides and a curve approximating the arched sections and are connected to each other on a longitudinal side via a hinge. The guide devices include a number of guide elements guided on a guide rail, wherein a respective guide element is arranged on the hinge and further guide elements are arranged on both sides of the hinge. The drive device drives the rearmost guide element (Continued)

via two traction transmissions, which have traction mechanisms running parallel to the straight section of the guide devices.

16 Claims, 5 Drawing Sheets

(51) Int. Cl.
  *F16P 3/02* (2006.01)
  *E06B 9/06* (2006.01)
  *E06B 9/00* (2006.01)
(58) Field of Classification Search
  USPC .......................... 160/118, 201; 73/462, 431
  See application file for complete search history.

(56) References Cited

U.S. PATENT DOCUMENTS

| | | | |
|---|---|---|---|
| 3,135,544 A * | 6/1964 | Mickey | B60J 5/08 160/201 |
| 3,662,410 A * | 5/1972 | Lankheet | E04H 3/16 160/201 |
| 4,929,862 A * | 5/1990 | Hamilton | A47F 3/002 160/32 |
| 5,868,639 A | 2/1999 | Hoermann | |
| 6,338,192 B1 * | 1/2002 | Kanai | F16P 3/08 29/741 |
| 6,386,658 B1 | 5/2002 | Dietrich et al. | |
| 6,796,206 B2 * | 9/2004 | Li | B23Q 11/0891 82/117 |
| 7,441,456 B1 | 10/2008 | Corbin et al. | |
| 2002/0157797 A1 * | 10/2002 | Mullet | E05D 13/1215 160/201 |

FOREIGN PATENT DOCUMENTS

| | | | |
|---|---|---|---|
| DE | 195 01 230 A1 | 7/1996 | |
| DE | 198 60 765 A1 | 7/2000 | |
| DE | 10 2006 045 733 A1 | 3/2008 | |
| DE | 10 2012 200 642 A1 | 7/2013 | |
| DE | 10 2013 203 665 A1 | 9/2014 | |
| DE | 102013005310 A1 * | 10/2014 | F16P 1/02 |

* cited by examiner

PROTECTIVE HOUSING FOR A TESTING, MEASURING OR PRODUCTION DEVICE

CROSS REFERENCE TO RELATED APPLICATIONS

This application is the National Stage of PCT/EP2016/060623 filed on May 12, 2106, which claims priority under 35 U.S.C. § 119 of German Application No. 10 2015 107 612.8 filed on May 13, 2015, the disclosure of which is incorporated by reference. The international application under PCT article 21(2) was not published in English.

This invention relates to a protective housing for a testing, measuring or manufacturing device, with a guard member which, held and guided by guide devices, is movable in a reciprocating motion by means of a drive device between a closed position closing a housing opening and an open position opening the housing opening, with the guide devices being arranged on oppositely facing end walls of the housing opening.

DE 198 60 765 A1 discloses a protective housing for a packaging machine which comprises a rectangular protective screen of a flexible, in particular Plexiglas material which protects the front or operator side from manual intervention during operation of the packaging machine. For maintenance or setup, for example, the protective screen is adjustable manually or by a drive mechanism from the closed operating position into an open position. To accomplish this, the lateral areas of the protective screen are guided by rollers or similar means in guide grooves in the end walls of the protective housing, such that, to be opened, the protective screen is slidable into a lower area of the housing of the packaging machine in the manner of a drawer. The guide grooves have a curved and a straight section so that it is necessary for the integrally formed protective screen to be bent when moved from the open position into the closed position, which increases the displacement forces.

In a second alternative embodiment known from DE 198 60 765 A1, for closing the housing opening provision is made for two protective screens guided in separate guides in the end walls, with the two guides extending parallel to one another over a wide range. In this arrangement, the one guide is made longer than the other guide, as a result of which the protective screens cover adjoining opening areas when in the closed position. In the open position, the protective screens are slidable one on top of the other in space-saving manner. In addition, one of the protective screens may be provided with a curvature shaped to conform to the arc-shaped section.

In a drive shaft balancing machine known from U.S. Pat. No. 7,441,456 B1, in order to completely close the front of the machine, two door assemblies are arranged on either side of the machine, each being comprised of three door elements super-imposed upon each other. The door elements are supported by rollers on upper and lower door rails and are movable relative to the machine framework by means of actuating devices. When actuated to a closed position, the first door elements are first moved into the closing direction, then causing the second door elements to follow their movement until these abut against the third door elements in the closed position. All the door elements then combine to form a closed array of still slightly overlapping door elements which protect persons in front of the machine from risks resulting from machine movements and welding operations for the attachment of corrective weights. The known door arrangement necessitates a relatively tall and weighty construction of the protective housing of the machine, and the opening and closing times are relatively long because of the long travel involved.

For testing, measuring and manufacturing devices in which parts rotate at high speed and there is a risk, due to testing or processing operations, that parts are ejected from the machine and may cause damage and injury, it is necessary for the protective housing and the movable guard member to be constructed in a highly robust and impact-resistant fashion. In consequence, suitable guard members become relatively heavy when a large housing opening is required for loading or operating the device received in the protective housing. At the same time, there is often the need to be able to open and close the housing opening by means of the guard member as quickly as possible because during these operations it is not possible to operate or control or load the devices in the protective housing. Such requirements have to be met, for example, for drive shaft balancing machines on which drive shafts are balanced in a periodic sequence. The protective housing of these machines requires a wide opening for loading and unloading the sometimes relatively long drive shafts, with the time spent to open and close the housing opening adversely affecting the cycle time for the successive balancing periods. High opening and closing speeds of the guard member produce, however, high acceleration and deceleration forces, thereby putting a strain on the guide device and the drive mechanism for the movable guard member.

It is an object of the present invention to provide a protective housing of the type initially referred to in which a relatively wide housing opening is closable with an impact-proof guard member and the time needed to open and close the housing opening is short. Furthermore, it is desirable for the devices for guiding the guard member and the drive device for moving the guard member to afford economy of manufacture, require little maintenance and distinguish themselves by low friction losses and a long service life.

The object referred to is accomplished by a protective housing embodying the features in accordance with the invention. Advantageous embodiments of the protective housing are discussed below.

The protective housing of the invention comprises a guard member which, held and guided by guide devices, is movable in a reciprocating motion by means of a drive device between a closed position closing a housing opening and an open position opening the housing opening, wherein the guide devices are arranged on oppositely facing end walls adjoining the housing opening, have on one front of the protective housing outwardly curved, arc-shaped sections and on one upper side of the protective housing are constructed in a rearwardly extending, straight-line configuration. This configuration makes allowance for a large useable interior space with a readily accessible opening and a low overall height of the protective housing. The guard member preferably comprises at least two flexurally stiff rectangular panels with straight long sides. The panels may have a curvature shaped to conform to the arc-shaped sections of the guide device and may be movably connected to one other on one long side, in particular by a hinge. As a result of the curved configuration of its panels, the guard member features a high flexural strength and is therefore able to span a housing opening of wide width also when constructed in a heavy, impact-proof configuration. Owing to the curvature of the panels, the guard member requires no space for movement on the inside of the guide. The connection of the adjacent long sides of the panels by a hinge results in an increase in flexural strength in both the open and the closed position of the guard member, and in the closed position provides for impact resistance on the interconnected long sides of the panels.

According to the present invention, each of the guide devices includes a guide rail secured to the end wall and a plurality of guide elements guided thereon which are rotatably mounted on the guard member. Preferably, one guide element may be arranged on the hinge and one further guide element each on either side of the hinge and in a spaced relationship thereto. The guide of the guard member by means of guide rails arranged on the end walls of the housing opening and guide elements embracing them affords economy of manufacture and ensures a durable, robust and low-friction guide permitting rapid movements of the guard member. When worn, the guide devices may be replaced at low cost.

According to the invention, the drive device for the guard member may include two flexible drive mechanisms adapted to be driven in synchronized fashion, each being arranged on the inside of the protective housing close to one of the guide devices and comprising a transmission means which extends parallel to the straight-line section of the respective guide device and is connected to a guide element in a driving relationship thereto.

The movement of the guard member by means of the flexible drive mechanisms drivable in synchronized fashion which are arranged close to the guide devices on either side of the housing opening ensures a jam-free movement of the guard member and the absorption of high acceleration and deceleration forces, thereby enabling rapid opening and closing of the guard member.

According to another proposal of the invention, the protective housing may have its upper side closed by means of a fixed roof panel extending from a rear edge of the housing opening to a rear wall of the protective housing. The arrangement of the fixed roof panel contributes to a downsizing of the housing opening and hence to a downsizing of the movable guard member for closing the same. The movable mass of the guard member and the length of the closing and opening travel of the guard member are accordingly smaller and therefore allow short closing and opening periods.

Preferably, the roof panel is arranged between the two flexible drive mechanisms, and the guard member is located above the roof panel in the open position. This arrangement of the guard member in the open position contributes to a low overall height of the protective housing.

To reduce the width of the housing opening, also the front side of the protective housing may be equipped with a fixed guard wall which extends from the lower edge of the housing opening to the proximity of the bottom. Advantageously, the guard wall may be provided with an elongated slot for the passage of control elements.

According to a proposal of the invention, the synchronized operation of the two flexible drive mechanisms may be accomplished in simple manner by coupling the two flexible drive mechanisms to a common drive shaft arranged parallel to one long side of the guard member. The drive shaft may be coupled to an in particular electrically driven geared motor arranged within the protective housing preferably on a side of an end wall facing away from the guide device. In another advantageous configuration, each of the two flexible drive mechanisms may be drivable by a separate electric motor, with the electric motors being jointly connected to an electric control device synchronizing the rotary motions of the electric motors. This configuration offers greater freedom in the spatial design of the protective housing and the arrangement of the electric motors.

According to the present invention, an advantageous embodiment of the guide elements includes spaced rollers which are rotatable about parallel axes and have the guide rail arranged therebetween. Preferably, each of the guide elements is provided with one pair of rollers on either side of the guide rail. The guide rail of the invention includes longitudinal grooves on its opposed sides into which the rollers engage with their circumferential surface. The embodiment of the guide elements of the invention is suitable for supporting and guiding a heavy guard member and distinguishes itself by low friction and a long service life.

According to another proposal of the invention, a flexible protective strip may be attached to the rearmost guide element, which with the guard member in closed position covers the straight-line portion of the guide device and eliminates the risk of injury when the guard member is opened. The protective strip may be routed around a rear end of the end wall while its other end may be secured to a slide block which is guided on a slide rail arranged on the side of the end wall facing away from the guide device and is drivingly connected to the transmission means of the flexible drive mechanism arranged on the end wall.

In order to maintain the protective strip at all times in tensioned condition regardless of external influences, it may also be connected to the slide block or the rearmost guide element by biased resilient means. Alternatively, the protective strip may also be provided with an elasticity suitable for maintaining the tension.

The present invention will be explained in more detail in the following with reference to an embodiment of the invention illustrated in the accompanying drawing. In the drawing, FIG. 1 is a view of a protective housing for receiving a drive shaft balancing machine, showing the guard member closed;

Figure 1:
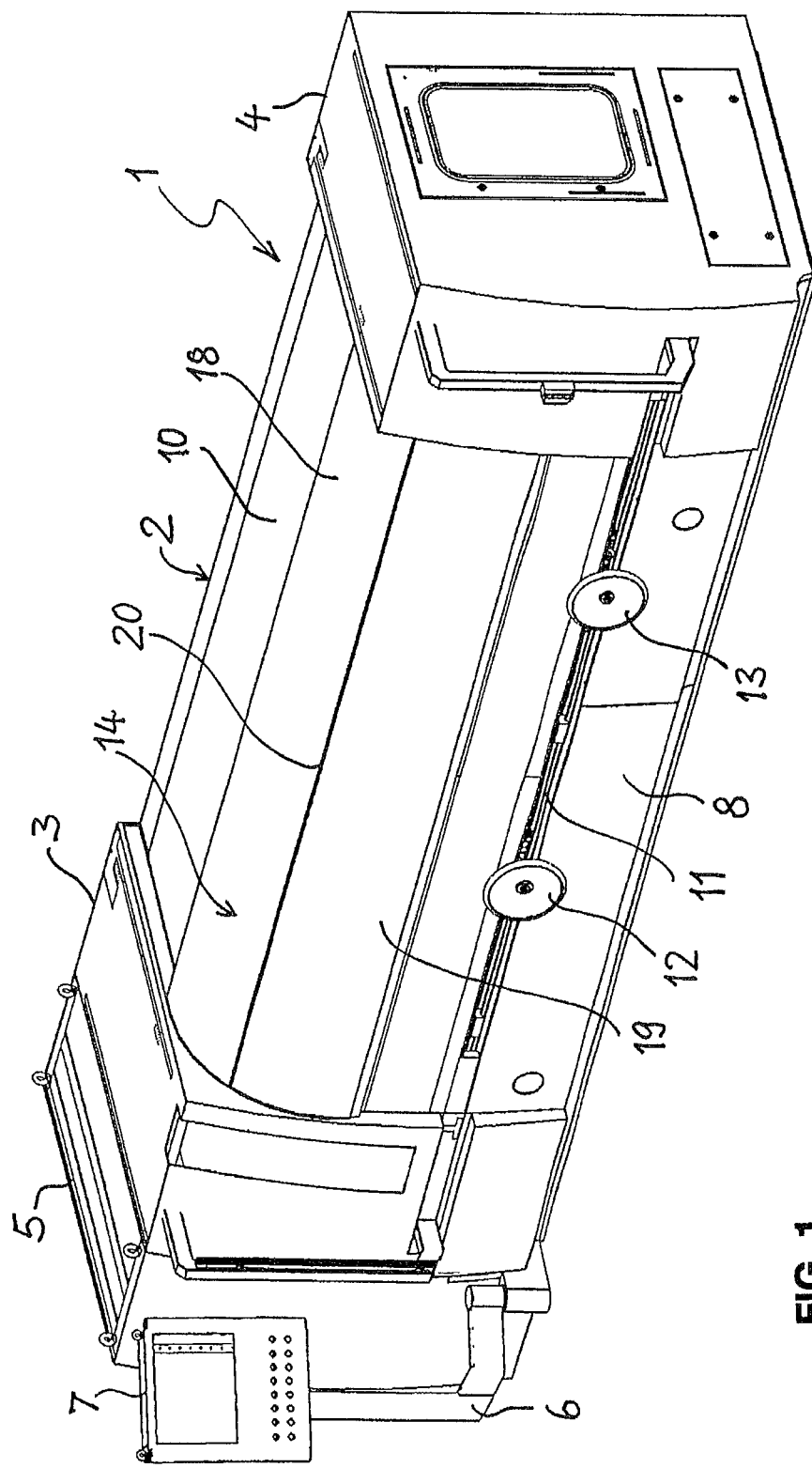

The protective housing 1 illustrated in FIG. 1 is intended for enclosing a balancing machine for the balancing of drive shafts. In view of the sometimes relatively long length of drive shafts, balancing machines for drive shafts usually have a relatively long overall length which may amount to 5 m and longer. A correspondingly long length is therefore also required for the protective housing. During the balancing operation, drive shafts are rotated at a relatively high balancing speed for measuring any existing out-of-balance condition. Considering that the high balancing speeds represent a potential risk, it is necessary for the balancing machine to be enclosed during rotation of the drive shaft by a protective housing which satisfies the requirements of a specific class of protection. This requires, for example, walls of robust construction and steel doors which resist the impact of a part flying off, for example, of a correction weight. For loading the balancing machine with the drive shafts to be balanced, the protective housing also requires a large housing opening through which the drive shafts can be loaded into the balancing machine by hand or by means of gripping devices. To close the housing opening, an impact-proof guard member of appropriate size is therefore likewise necessary.

The protective housing 1 is comprised of an elongated central portion 2 adjoined by a respective shoulder portion 3, 4 at either end. The shoulder portions 3, 4 are slightly higher and wider than the central portion 2 from which they are stepped a small amount. Within the protective housing 1 the shoulder portions 3, 4 are connected to the central portion 2 by wide openings, combining with the central portion 2 to form a uniform machine space receiving the individual units of the balancing machine. The shoulder portions 3, 4 are closed at their outside ends.

On the side facing away from the central portion 2, the shoulder portion 3 is adjoined by a cabinet portion 5 serving as switch cabinet for accommodating the electrical units needed for power supply to, and control of, the balancing machine. Arranged on the cabinet portion 5 is a tubular swivel arm 6 with a visual display unit 7 for display of the measurement and evaluation data concerning the individual balancing operation.

Figure 2:
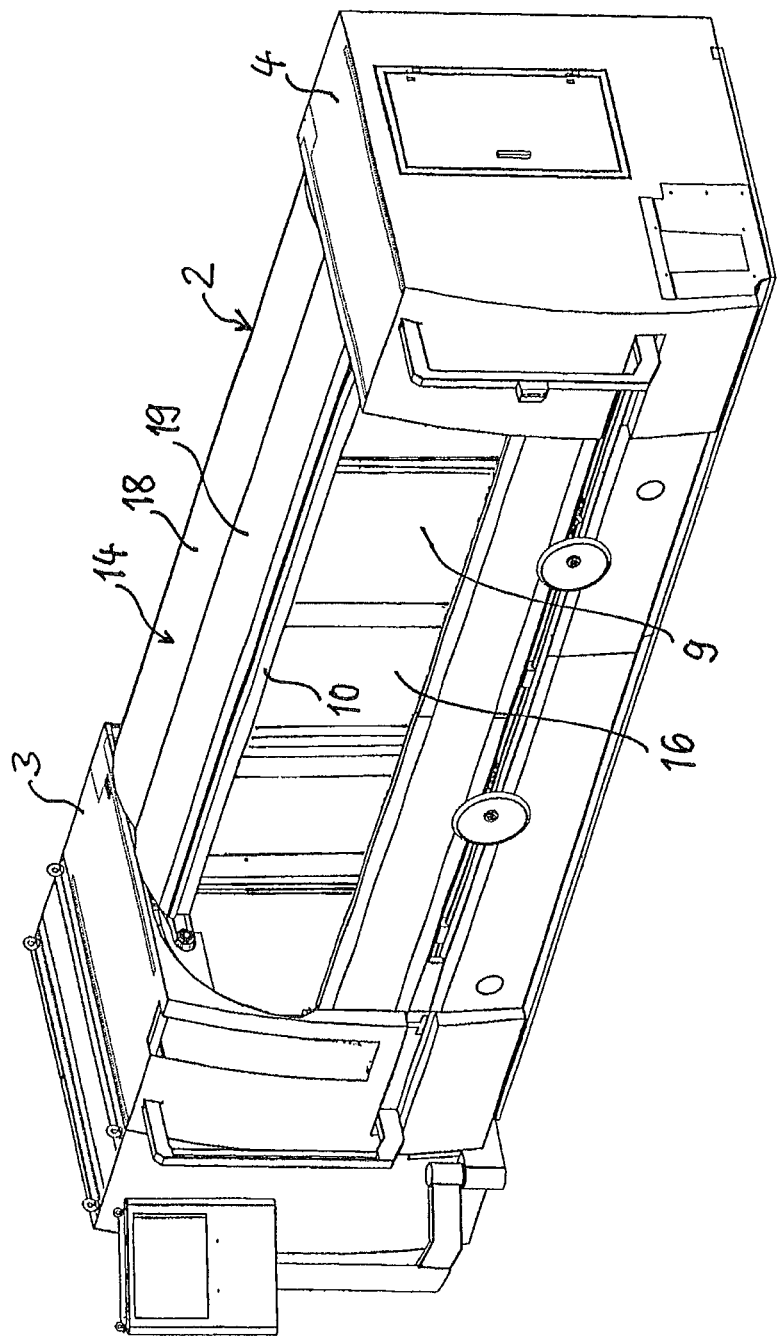
FIG. 2 is a view of the protective housing of FIG. 1, showing the guard member open.

The central portion 2 has on its front a fixed wall 8 extending from the bottom up to about half the height of the protective housing 1, and a fixed rear wall 9 shown in FIG. 2. The top of the central portion 2 is closed by a plane, fixed roof panel 10. The wall 8 has roughly in its middle a horizontal slot 11 which is continued in the shoulder portion 4 and through which control elements 12, 13 of the balancing machine extend to the outside. A movable guard member 14 is located between the upper horizontal edge of the wall 8 and the front horizontal edge of the roof panel 10. The guard member 14 closes, as depicted in FIG. 2, a rectangular housing opening 16 which extends from the shoulder portion 3 to the shoulder portion 4 and terminates on the wall 8 at the bottom and on the roof panel 10 at the top. The opening 16 thus comprises in its height about the upper half of the front of the central portion 2 and part of its top so that the balancing machine in the interior of the protective housing 1 is easily accessible for loading and unloading drive shafts through the opening 16.

The guard member 14 is comprised of two rectangular, flexurally stiff panels 18, 19 rotatably connected to each other on one of their long sides by a hinge 20 in the manner of a piano hinge. On its transverse ends the guard member 14 is movably held and guided by means of guide devices mounted on the mutually facing end walls 21, 22 of the shoulder portions 3, 4. The curvature of the panels 18, 19 and the guide devices are constructed such that the guard member 14 exhibits a uniform, outwardly arched curvature in the closed position shown in FIG. 1. The radii of curvature of the two panels 18, 19 are equal, and in the closed position of the guard member 14 the axes of curvature of the two panels 18, 19 coincide in a single axis.

In the open position shown in FIG. 2, the guard member is above the roof panel 10, with the long sides of the panels 18, 19 lying in a plane parallel to the roof panel 10. In this arrangement of the panels 18, 19, the height of the guard member 14 which is dependent on the curvature is relatively small, thereby contributing to the achievement of a low overall height of the protective housing 1.

Figure 3:
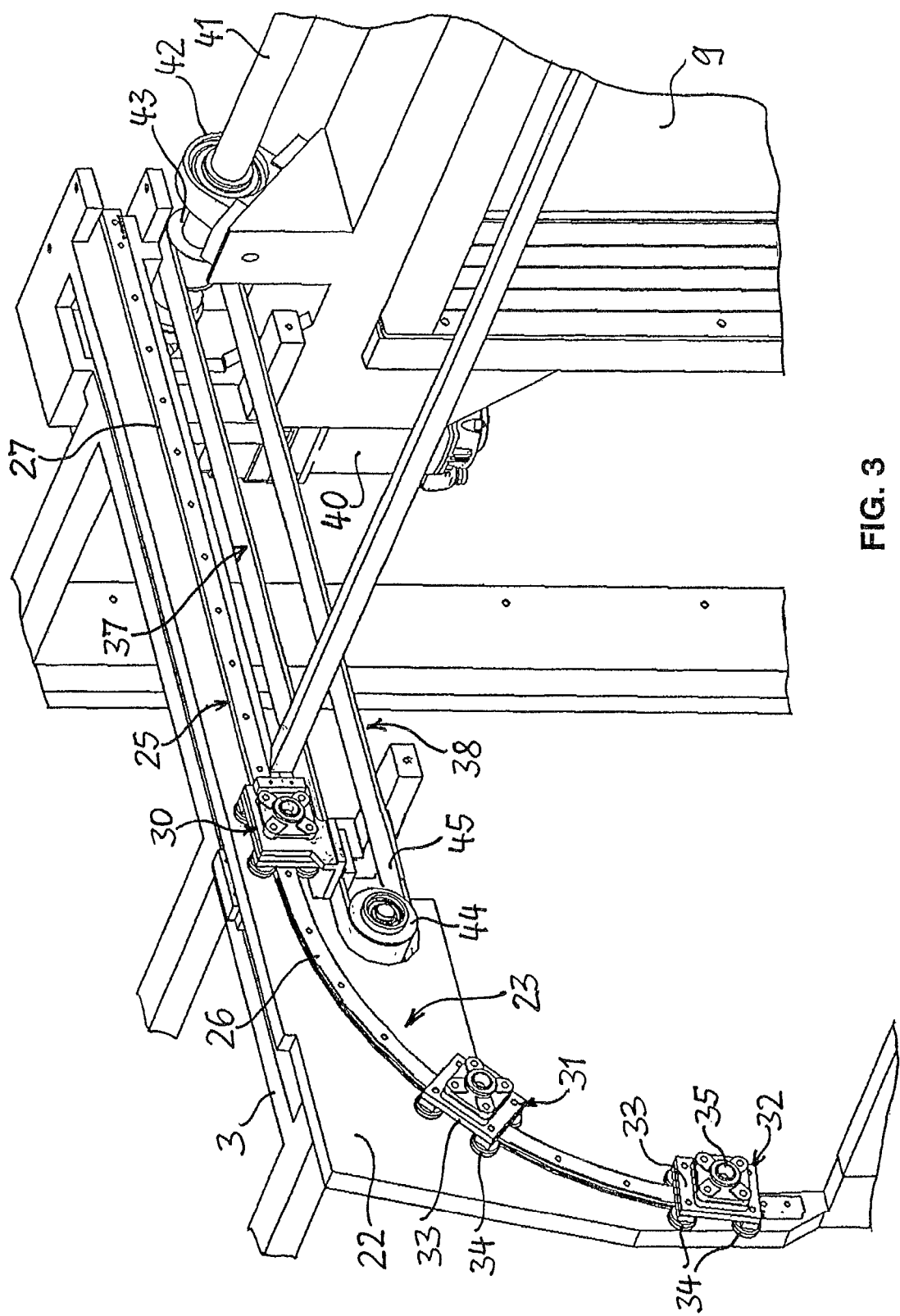
FIG. 3 is a detail view of the framework of the protective housing of FIG. 1, showing the guide device and the drive device mounted thereon for holding and moving the guard member.

FIG. 3 shows the one guide device 23 arranged on an end wall 22 of the shoulder portion 3 for guiding and supporting the one transverse end of the guard member 14. A guide device 24 constructed in like manner, yet mirror-inverted, is arranged on the opposite end wall of the shoulder portion 4 and guides and supports the other transverse end of the guard member 14.

The guide device 23 has a guide rail 25 mounted on the end wall 22 and forming in the front area a circular-arc-shaped rail portion 26 adjoined in the rear area by a straight-line, horizontal rail portion 27. The arcuate rail portion 26 extends substantially over the arc length of a quadrant. On its opposite sides, the guide rail 25 is provided with longitudinal grooves.

Three identical guide elements 30, 31, 32 are arranged on the guide rail 25. Each of the guide elements 30, 31, 32 has a plate-shaped, rectangular body 33 carrying on one side four journaled rollers 34 of which two rollers are arranged on the one side, and two rollers on the other side, of the guide rail 25, each being in engagement with the longitudinal groove of the guide rail 25. In this way, the guide elements 30, 31, 32 are held in positive engagement with, and longitudinally movable on, the guide rail 25.

On the side of the body 33 facing away from the rollers 34, each of the guide elements 30, 31, 32 mounts a pivot bearing 35 serving to rotatably support the guard member 14. Secured to the pivot bearing 35 of the guide element 30 and to the pivot bearing 35 of the guide element 32 are, respectively, the rear end and the front end of the transverse side of the guard member 14. The pivot bearing 35 of the guide element 31 is connected to the axis of the hinge 20. By analogy, the opposite transverse-side end of the guard member 14 is attached to the mirror-inverted, identical guide device 24 mounted on the shoulder portion 4. Being supported on the two guide devices 23, 24, the guard member 14 is capable of moving easily back and forth between the open and the closed positions.

Figure 4:
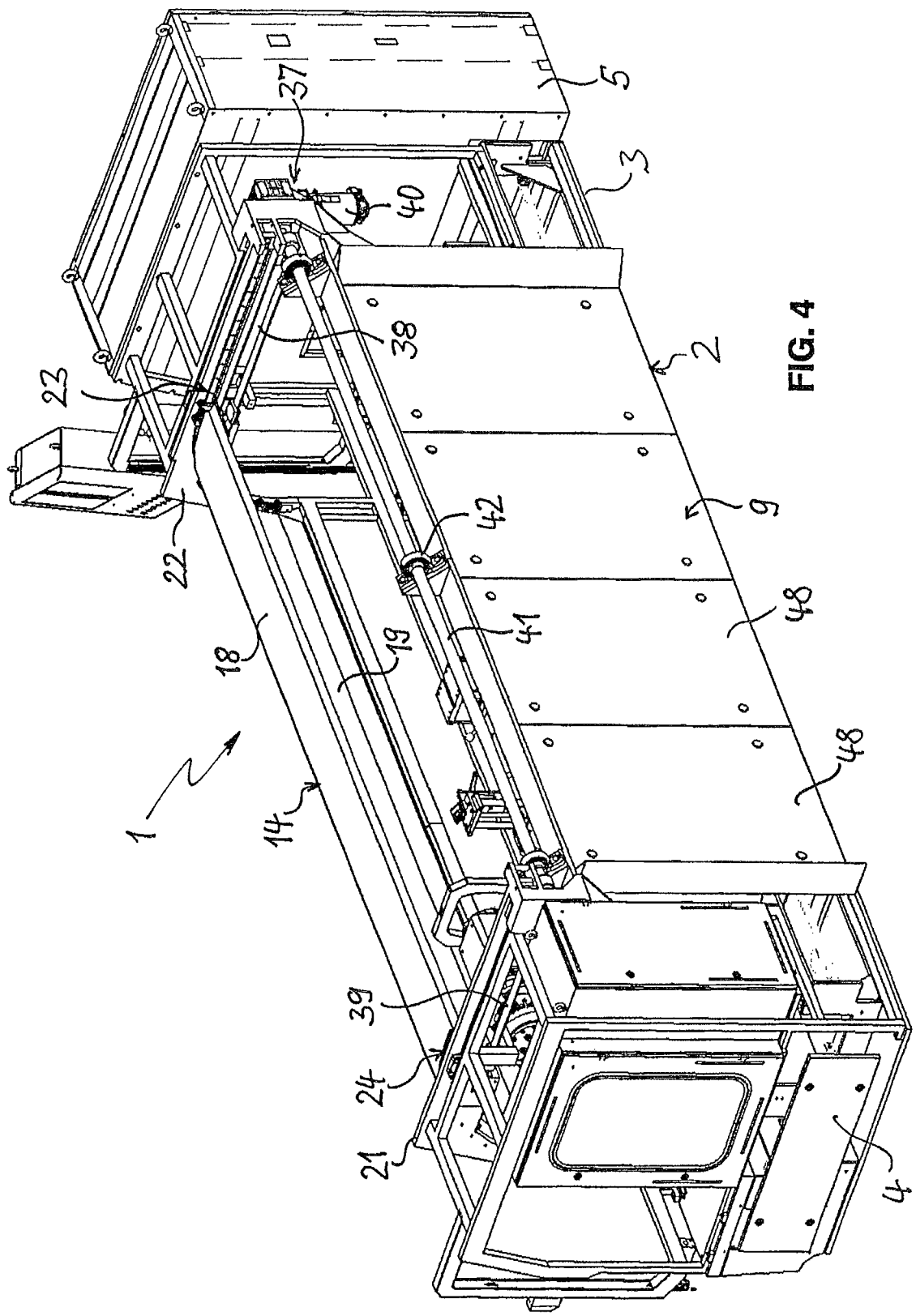
FIG. 4 is a partially stripped rear view of the protective housing of FIG. 1.

The mass of the guard member 14 caused by its size and the need to fulfill a guard function does not, as a rule, allow opening and closing by hand. To move the guard member 14, a drive device 37 is therefore provided which comprises two flexible drive mechanisms 38, 39 associated with the guide devices 23, 24 and a drive motor 40 driving a drive shaft 41 shared by the two flexible drive mechanisms 38, 39. As shown in FIG. 4, the drive shaft 41 is advantageously arranged on the upper rear corner of the protective housing 1 underneath the rear ends of the guide devices 23, 24 and is carried in pillow block housings 42. Each flexible drive mechanism 38, 39 comprises a driver pulley 43 arranged on the drive shaft 41 and an idler pulley 44 which is arranged close to the curved rail portion 26 of the guide devices 23, 24. A toothed belt is preferably used as transmission means 45. Alternatively, however, a chain may also be used. The driver pulley 43 and the idler pulley 44 are arranged in such a manner that the belts of the transmission means 45 extend parallel to the straight-line rail portions 27 of the guide devices 23, 24. The rear guide element 30 is secured to the upper belt of the transmission means 45.

When the drive shaft 43 is driven in clockwise direction by the drive motor 40 as depicted in FIG. 3, this results in a displacement of the position of the transmission means connected to the guide element 30 in the direction of the driver pulley 43 and hence in a movement of the guide element 30 in the direction of the rear end of the guide rail 25. Driven by the flexible drive mechanism 39, the guide element of the guide device 24 corresponding to the guide element 30 performs a synchronous movement. Accordingly, the guard member 14 is moved by the guide elements 31, 32 from its front closed position into the open position, with the guide elements 31, 32 and the corresponding guide elements of the guide device 24 taking part in this movement and guiding the guard member 14 on the guide rails. The open position is reached when the rear guide elements are in their end position close to the drive shaft 41.

FIG. 4 shows the protective housing 1 from the rear, parts of the paneling of the shoulder portions 3, 4 and the roof panel 10 being omitted in this representation. The guard member 14 spanning the central portion 2 is shown in the closed position in which it is held on the guide devices 23, 24. Also shown is the drive shaft 41 which connects the flexible drive mechanisms 38, 39 to one another and is coupled to the drive motor 40 arranged in the interior of the shoulder portion 3. The rear wall 9 of the central portion 2 is closed by plane panels 48 performing a guard function.

Figure 5:
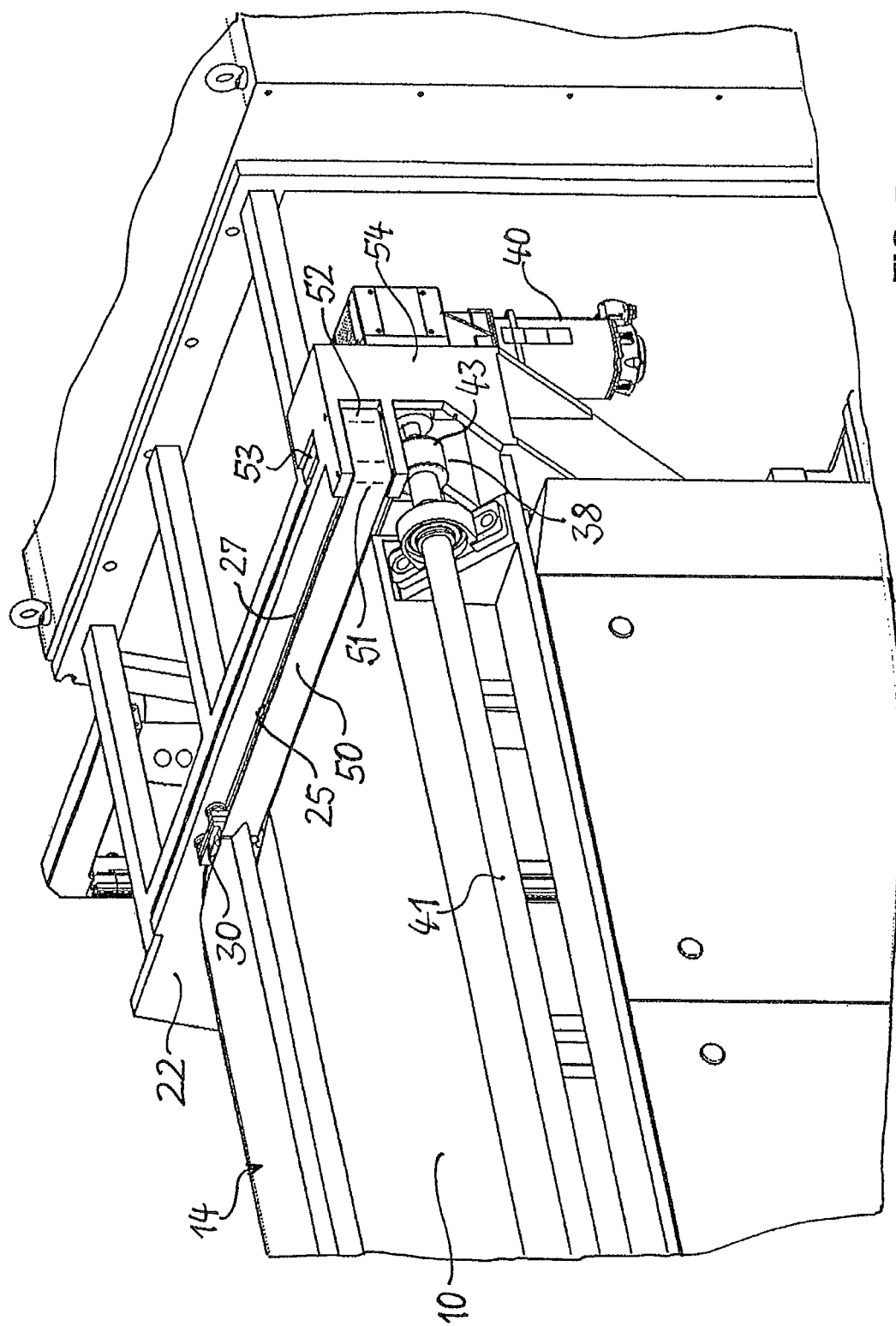
FIG. 5 is a partially stripped detail view of the rear side of the protective housing of FIG. 1.

FIG. 5 shows a detail view of the rear side of the protective housing 1 in which the top of the central portion 2 is closed by the roof panel 10 and the guard member 14 is in the closed position. Also depicted in this view is the arrangement of a protective strip 50 covering and protecting the straight-line rail portion 27 of the guide rail 25.

The protective strip 50 has one of its ends secured to the rearmost guide element 30 where it extends to two parallel guide rollers 51, 52 around which it is routed to the other side of the end wall 22 where the other end of the protective strip 50 is secured to a slide block 53. The guide rollers 51, 52, are mounted on a support 54 arranged on the rear end of the end wall 22 and supporting also the drive motor 40. The slide block 53 slides on a slide rail which extends parallel to the straight-line rail portion 27 of the guide rail 25 on the rear side of the end wall 22. Extending from the slide block 53 is also an arm which is passed through an opening in the end wall 22 to the flexible drive mechanism 38. In the position of the flexible drive mechanism 38 shown in FIG. 5, the end of the arm is secured to the lower belt of the transmission means in the proximity of the driver pulley 43. As a result, the guide element 30 and the slide block 53 are connected with each other through the flexible drive mechanism 38, their position on the end wall 22 being determined by the flexible drive mechanism 38.

When for opening the guard member 14 the guide element 30 is driven via the upper belt of the flexible drive mechanism 38 and moved in the direction of the support 54, the slide block 53 is at the same time moved by the lower belt of the flexible drive mechanism 38 at the same speed but in the opposite direction, causing the protective strip 50 to be pulled continuously over the guide rollers 51, 52 to the other side of the end wall 22 where the slide block 53 is located. On closing the guard member 14, the guide element 30 and the slide block 53 move in the reverse direction, with the protective strip 50 being again pulled by the guide element 30 into the position shown in FIG. 5. The protective strip 50 is maintained in tension during both movements, with the added possibility for a biased spring element being arranged to maintain a certain bias between the guide element 30 or the slide block 53 and the corresponding end of the protective strip 50. It is also possible for the protective strip itself to be provided with a spring effect suitable for maintaining a permanent bias.

The invention claimed is:

1. A protective housing for a testing, measuring or manufacturing device, with a guard member which, held and guided by guide devices, is movable in a reciprocating motion by means of a drive device between a closed position closing a housing opening and an open position opening the housing opening,
wherein the guide devices are arranged on oppositely facing end walls adjoining the housing opening, have on one front of the protective housing outwardly curved, arc-shaped sections and on one upper side of the protective housing are constructed in a rearwardly extending, straight-line configuration,
wherein the guard member comprises at least two flexurally stiff rectangular panels having straight long sides and being movably connected to each other on one long side each,
wherein each of the guide devices includes a guide rail secured to the end wall and a plurality of guide elements guided thereon which are rotatably mounted on the guard member and arranged in a spaced relationship to one another, and
wherein the drive device includes two flexible drive mechanisms adapted to be driven in synchronized fashion, each being arranged on the inside of the protective housing close to one of the guide devices and comprising a transmission means which extends parallel to the straight-line section of the respective guide device and is connected to a guide element in a driving relationship thereto.

2. The protective housing according to claim 1, wherein at least one of the panels has a curvature shaped to conform to the arc-shaped sections of the guide devices.

3. The protective housing according to claim 1, wherein the panels are connected to one other on one long side by a respective hinge.

4. The protective housing according to claim 3, wherein one guide element is arranged on the hinge and one further guide element each is arranged on either side of the hinge and in a spaced relationship thereto.

5. The protective housing according to claim 1, wherein its upper side is closed by means of a fixed roof panel extending from a rear edge of the housing opening to a rear wall of the protective housing.

6. The protective housing according to claim 5, wherein the roof panel is arranged between the two flexible drive mechanisms, and the guard member is located above the roof panel in the open position.

7. The protective housing according to claim 1, wherein the front side of the protective housing is equipped with a fixed guard wall which extends from the lower edge of the housing opening to the proximity of the bottom.

8. The protective housing according to claim 7, wherein the guard wall is provided with an elongated slot.

9. The protective housing according to claim 1, wherein the two flexible drive mechanisms are coupled to a common drive shaft extending parallel to one long side of the guard member.

10. The protective housing according to claim 1, wherein each of the two flexible drive mechanisms is drivable by a separate electric motor, with the electric motors being jointly connected to an electric control device synchronizing the rotary motions of the electric motors.

11. The protective housing according to claim 1, wherein the flexible drive mechanism is coupled to a drive motor arranged within the protective housing on a side of an end wall facing away from the guide device.

12. The protective housing according to claim 1, wherein each guide element includes spaced rollers which are rotatable about parallel axes and have the guide rail arranged therebetween.

13. The protective housing according to claim 1, wherein each of the guide elements includes a journal bearing to which the guard member is attached.

14. The protective housing according to claim 1, wherein the guide rail includes longitudinal grooves on opposed sides into which the rollers engage.

15. A protective housing for a testing, measuring or manufacturing device, with a guard member which, held and guided by guide devices, is movable in a reciprocating motion by means of a drive device between a closed position closing a housing opening and an open position opening the housing opening,
- wherein the guide devices are arranged on oppositely facing end walls adjoining the housing opening, have on one front of the protective housing outwardly curved, arc-shaped sections and on one upper side of the protective housing are constructed in a rearwardly extending, straight-line configuration,
- wherein the guard member comprises at least two flexurally stiff rectangular panels having straight long sides and being movably connected to each other on one long side each,
- wherein each of the guide devices includes a guide rail secured to the end wall and a plurality of guide elements guided thereon which are rotatably mounted on the guard member and arranged in a spaced relationship to one another and
- wherein one end of a flexible protective strip is attached to the rearmost guide element, which with the guard member in closed position covers the straight-line portion of the guide device.

16. The protective housing according to claim 15, wherein the protective strip is routed around a rear end of the end wall via guide rollers while its other end is secured to a slide block which is guided on a slide rail arranged on the side of the end wall facing away from the guide device and is drivingly connected to the transmission means of the flexible drive mechanism arranged on the end wall.

* * * * *